United States Patent
Pfizenmaier et al.

[11] Patent Number: 5,963,172
[45] Date of Patent: Oct. 5, 1999

[54] HEAD LAMP WITH INTEGRATED MICROWAVE ANTENNA

[75] Inventors: Heinz Pfizenmaier, Leonberg; Hans-Peter Petry, Sulzbach-Laufen, both of Germany

[73] Assignee: Robert Bosch GmbH, Germany

[21] Appl. No.: 08/945,480

[22] PCT Filed: Dec. 19, 1996

[86] PCT No.: PCT/DE96/02454

§ 371 Date: Oct. 28, 1997

§ 102(e) Date: Oct. 28, 1997

[87] PCT Pub. No.: WO97/32357

PCT Pub. Date: Sep. 4, 1997

[30] Foreign Application Priority Data

Feb. 29, 1996 [DE] Germany .................. 196 07 653

[51] Int. Cl.[6] ........................................ H01Q 1/06
[52] U.S. Cl. ..................... 343/721; 343/713; 343/712
[58] Field of Search ........................... 343/721, 711, 343/712, 713, 781 P, 782; H01Q 1/06

[56] References Cited

U.S. PATENT DOCUMENTS 3,683,379 8/1972 Saddler et al. ................. 343/721
5,446,470 8/1995 Avignon et al. ................. 343/721

FOREIGN PATENT DOCUMENTS 0559546 9/1993 European Pat. Off. .
0573319 12/1993 European Pat. Off. .

*Primary Examiner*—Hoanganh Le
*Attorney, Agent, or Firm*—Venable; George H. Spencer; Norman N. Kunitz

[57] ABSTRACT

A headlight with an integrated microwave antenna is provided with a rotationally-symmetrical, paraboloid reflector (21) and direct, lateral radiation of the microwaves. An electrical feeder element (15) is disposed to the side of the reflector (21) and, seen in the radiation direction (14), with suitable spacing in front of a light source (13). The arrangement of the feeder element (15) of the microwave system according to some embodiments is such that the radar beam is directed and bundled over the upper half of the reflector. The beam path for the light source is represented by the respective edge beams (131) and (132). The beam path for the feeder element (15) of the microwave system is represented by the respective edge beams (151) and (152). The optical system with its light source (13) and the microwave system with its feeder element (15) and/or receiver element are functionally and spatially configured and disposed completely separately from one another. Being separately optimized, the two systems can then be adjusted together in the common housing of the headlight.

18 Claims, 4 Drawing Sheets

HEAD LAMP WITH INTEGRATED MICROWAVE ANTENNA

STATE OF THE TECHNOLOGY

The invention is based on a headlight, particularly a motor vehicle headlight, with an integrated microwave antenna of the generic type having a reflector that is used both for bundling the light of the headlight and for bundling the microwave beams.

In a known headlight of this type (U.S. Pat. No. 3,683, 379), the filament of a headlight bulb is used both to emit the optical radiation in the visible-light range and in the function of the radiator, beam reflector and receiving antenna for high frequencies. The use of the filament is provided in conjunction with a vehicle warning and control system for maintaining a sufficiently safe distance from preceding vehicles. This type of system is also called distance radar in vehicles. This known system operates at a frequency of about 850 MHz, which is insufficient for meeting today's requirements for a relatively high-resolution, more precise distance radar. Moreover, the operating frequency has an upper limit because the filaments of the headlight bulb can hardly be wound smaller and narrow than spirals for attaining higher frequencies. Thus, this known headlight with an integrated microwave antenna has an inherent, systemstipulated upper frequency limit.

Furthermore, EP 0 559 546 A1 discloses a microwave antenna for a transmitter and/or receiver of a vehicle and a headlight filament for an embodiment of the same. In this instance, the high-frequency radiator element is disposed inside the glass sphere of the incandescent bulb, near the filament arranged there for high beams and low beams, and near the focal point of the headlight reflector. Aside from the very complex design of such a bulb, the local association of a visible-light source and a microwave-radiation source are rigidly connected to one another by this arrangement.

These known headlights with an integrated microwave antenna provide either a functional coupling of the filament or a spatially-rigid coupling of the filament with the microwave antenna.

The problems found in the prior art as discussed above generally are overcome according to the present invention by a headlight, particularly a motor-vehicle headlight, with an integrated microwave antenna, and having a reflector that is used both for bundling the light of the headlight and for bundling the microwave beams, and wherein the optical system with its light source and the microwave system with its feeder element and/or receiver element are configured and disposed functionally and spatially completely separately from one another.

SUMMARY AND ADVANTAGES OF THE INVENTION

In contrast, the headlight of the invention, having an integrated microwave antenna as discussed above, has the advantage of optimum bundling of the headlight light as well as the radar beams; with a suitably-selected reflector geometry, and the possible arrangement of the light source and the microwave-radiation source independently of one another, the optimum radar-beam shape can be achieved independently of the desired light bundling. This solution saves costs and space, and, with an optimized light bundling and radar-lobe shape, permits simultaneous adjustment of light and radar beams.

In accordance with the invention, this principle is attained in that the optical system with its light source and the microwave system with its feeder element and/or receiving element are functionally and spatially configured and arranged completely separately from one another.

Advantageous modifications of and improvements to the basic headlight with an integrated microwave antenna, as described above are possible with the measures outlined in the further claims.

A particularly useful embodiment of the invention provides paraboloid reflectors. In an advantageous modification of the invention, the reflector is provided with a scatter plate and/or a dielectric lens. In corresponding, advantageous embodiments, the reflector can further be configured to be rotationally symmetrical or an offset reflector.

In accordance with an advantageous embodiment of the invention, the feeder element is a feeder horn, a dielectric feeder radiator or a microstrip patch or microstrip patch array. Corresponding to a particularly useful modification of the invention, the microwaves are radiated toward the reflector directly or indirectly by means of the feeder element, particularly via a sub-reflector or auxiliary reflector.

Corresponding to a further, particularly useful embodiment of the invention, the feeder element or a sub-reflector is disposed such that it can block the direct light of the light source.

A particularly advantageous embodiment of the invention provides that the light source and a planar microwave feeder element or a plurality thereof, and/or microwave receiver elements are mounted on a common, level carrier substrate, and that the carrier substrate is disposed outside of an offset reflector.

In an advantageous modification of this embodiment of the invention, the radiation can be advantageously effected in two different ways, depending on the application and the respective space conditions. On the one hand, the arrangement of the carrier substrate and the elements disposed thereupon allows direct radiation of light and microwaves. On the other hand, the arrangement of the carrier substrate and the elements disposed thereupon allows indirect radiation of light and microwaves, with the provision of a correspondingly-shaped and -arranged auxiliary reflector and the configuration of the offset reflector as a specially-shaped part. In an advantageous modification of this embodiment, the auxiliary reflector and/or the offset reflector can be a cutout of a rotational ellipsoid or a rotational hyperboloid.

In a further advantageous embodiment of the invention, a halogen lamp, particularly an H4 lamp, or a gas discharge lamp, particularly a high-pressure gas discharge lamp, is provided as the light source.

To meet the requirements of radar system precision in the respective applications, corresponding to a further advantageous embodiment of the invention, the microwave system is operated in a range of about 10–100 GHz, preferably in a range of about 76–77 GHz.

BRIEF DESCRIPTION OF THE DRAWINGS

The invention is described in detail in the description below by way of embodiments illustrated in the drawings wherein.

DETAILED DESCRIPTION OF THE PREFERRED EMBODIMENTS

Figure 1:
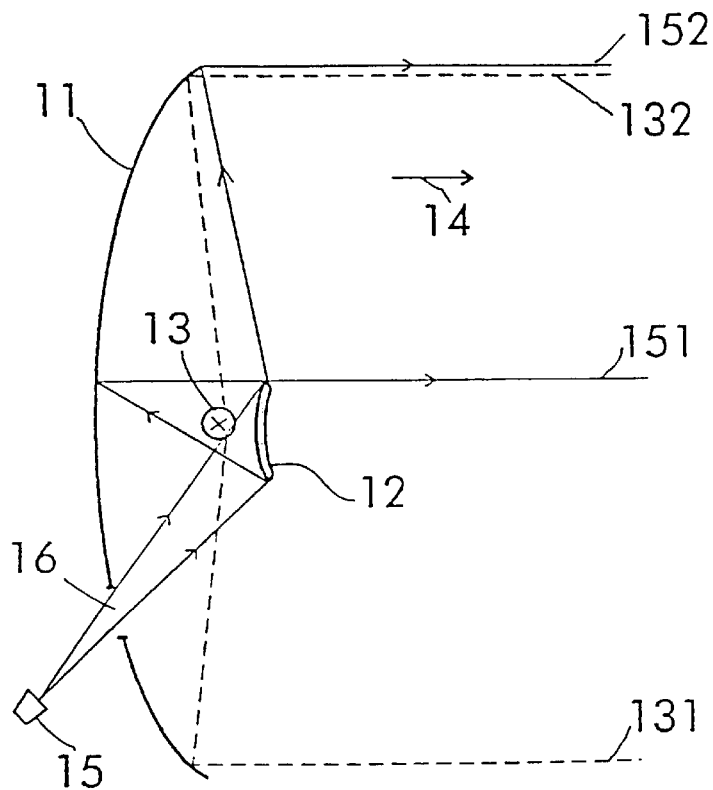
FIG. 1 is a schematic, side view of a first embodiment of the headlight with an integrated microwave antenna according to the invention, having a rotationally-symmetrical reflector and sub-reflector.

FIG. 1 shows a schematic, side view of a first embodiment of the headlight with an integrated microwave antenna according to the invention, having a rotationally-symmetrical, paraboloid reflector 11 and a suitably-shaped sub-reflector 12. A light source 13 is disposed between the reflector 11 and the sub-reflector 12. The sub-reflector 12 is mounted such that it blocks the direct light radiation of the light source 13 in the radiation direction 14. The radiation of a feeder element 15 of the microwave system is directed from behind toward the sub-reflector 12 through a opening 16 in the reflector 11 that is suitably positioned, for example centrally or outside of the center. In the illustrated embodiment, the sub-reflector 12, along with the feeder element 15 and the opening 16, are disposed such that the microwave radiation is bundled and radiated over the upper half of the reflector 11. It is clear that, on the reverse path, the radar beams reflected by the target object reach a receiving element that is effective at the location of the feeder element 16, for example, the feeder element itself. The feeder element can simultaneously be a receiving element by means of a directional filter that can be a circulator or bidirectional coupler. The beam path for the light source 13 is represented by the respective edge beams 131 and 132. The beam path. for the feeder element 16 of the microwave system is represented by the respective edge beams 151 and 152.

Figure 2:
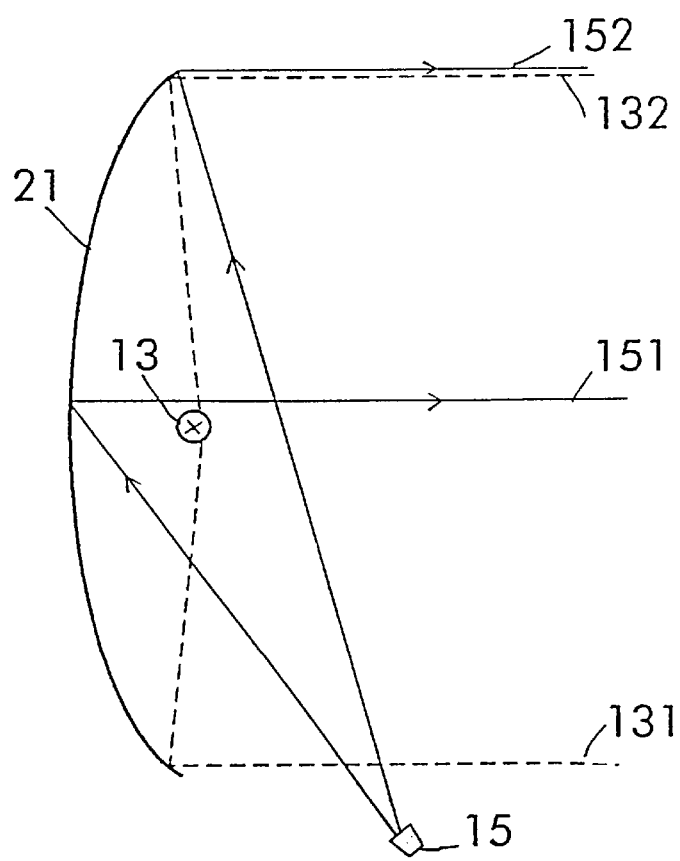
FIG. 2 is a schematic, side view of a second embodiment of the headlight with an integrated microwave antenna according to the invention, having a rotationally-symmetrical reflector and direct, lateral radiation of microwaves.

FIG. 2 shows a schematic, side view of a second embodiment of the headlight with an integrated microwave antenna according to the invention, having a rotationally-symmetrical, paraboloid reflector 21 and direct, lateral radiation of the microwaves. Here the feeder element 15 is disposed to the side of the reflector 21 and, seen in the radiation direction 14, at a suitable distance in front of the light source 13.

In this embodiment as well, the arrangement of the feeder element 15 of the microwave system is such that the radar beam is directed and bundled over the upper half of the reflector 21. The beam path for the light source 13 is again represented by the respective edge beams 131 and 132. The beam path for the feeder element 15 of the microwave system is again represented by the respective edge beams 151 and 152.

Figure 3:
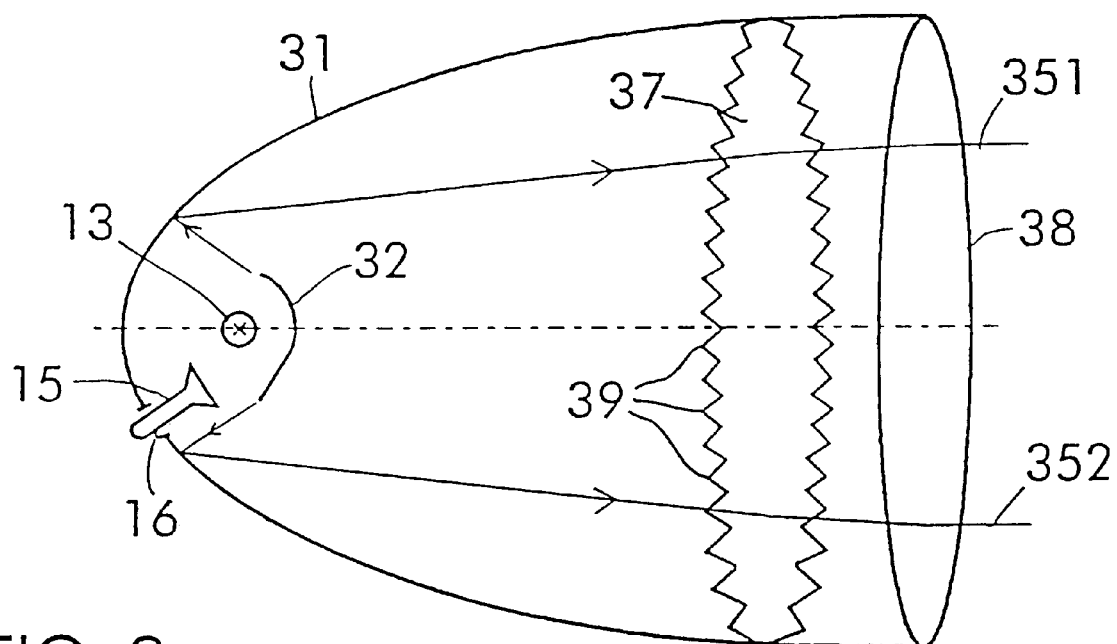
FIG. 3 is a schematic, side view of a third embodiment of the headlight with an integrated microwave antenna according to the invention, having a rotationally-symmetrical reflector, a sub-reflector and corrective lenses.

In a further embodiment of the headlight with an integrated microwave antenna according to the invention, as shown in a schematic, side view in FIG. 3, a rotationally-symmetrical, paraboloid reflector 31 is provided with a sub-reflector 32 and corrective lenses 37 and 38. This arrangement is similar to the one shown in FIG. 1. Here, however, the feeder element 15 of the microwave system projects through an opening 16 through the center of the reflector 31 or, as shown, into the reflector chamber at a suitable position outside of the center. The radiated radar radiation impacts the sub-reflector 32, whose curvature extends in the opposite direction of the reflector 31 and is positioned such that it blocks the direct radiation of the light source 13 with respect to the headlight opening.

The two corrective lenses 37 and 38 are mounted in the region of this headlight opening. The one corrective lens 38 can be an optical corrective lens, and the corrective lens 37 can be a dielectric corrective lens. These two corrective lenses 37 and 38 rectify both the optical beam path and the radar beam path. Its edge beams are provided with the reference numerals 351 and 352. The dielectric corrective lens 37 is preferably produced from a material having a high dielectric permittivity of $\epsilon_r \approx 10$, for example $Al_2O_3$ ceramic or plastic filled with $TiO_2$. To improve the reflection coefficient, this dialectic lens 37 can further be provided with "matching grooves" 39.

Figure 4:
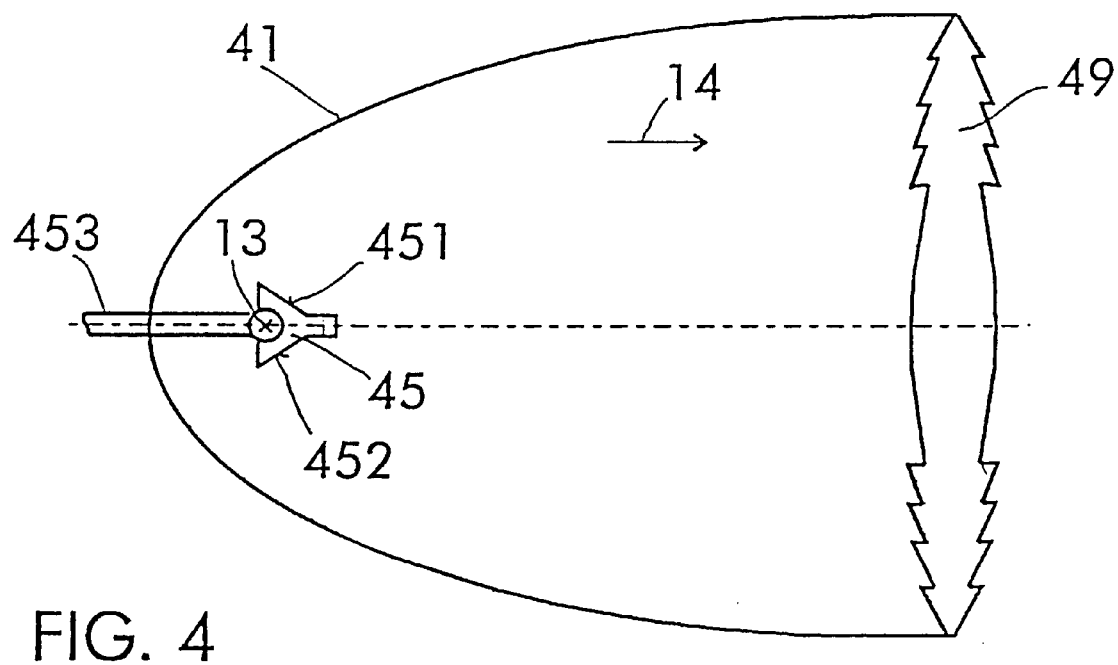
FIG. 4 is a schematic, side view of a fourth embodiment of the headlight with an integrated microwave antenna according to the invention, having a rotationally-symmetrical reflector, a scatter plate and a feeder element that blocks direct light.

FIG. 4 shows a schematic, side view of a fourth embodiment of the headlight with an integrated microwave antenna according to the invention. A rotationally-symmetrical, paraboloid reflector 41 is closed toward the front, in the radiation direction 14, by a scatter plate 49, which can be formed by a Fresnel lens. The reflector 41 could also be a cutout of a rotational paraboloid. A feeder element 45 is configured and arranged so as to block the direct light of the light source 13 in the radiation direction 14. A feeder horn or horn radiator, for example, that irradiates the surfaces 451 and 452 with microwave radiation can be used as the feeder element 45. A dielectric feeder radiator can also be used as the feeder element 45. The feeder element 45 is supplied with energy via a hollow conductor 453 that is disposed centrally, for example.

Figure 5:
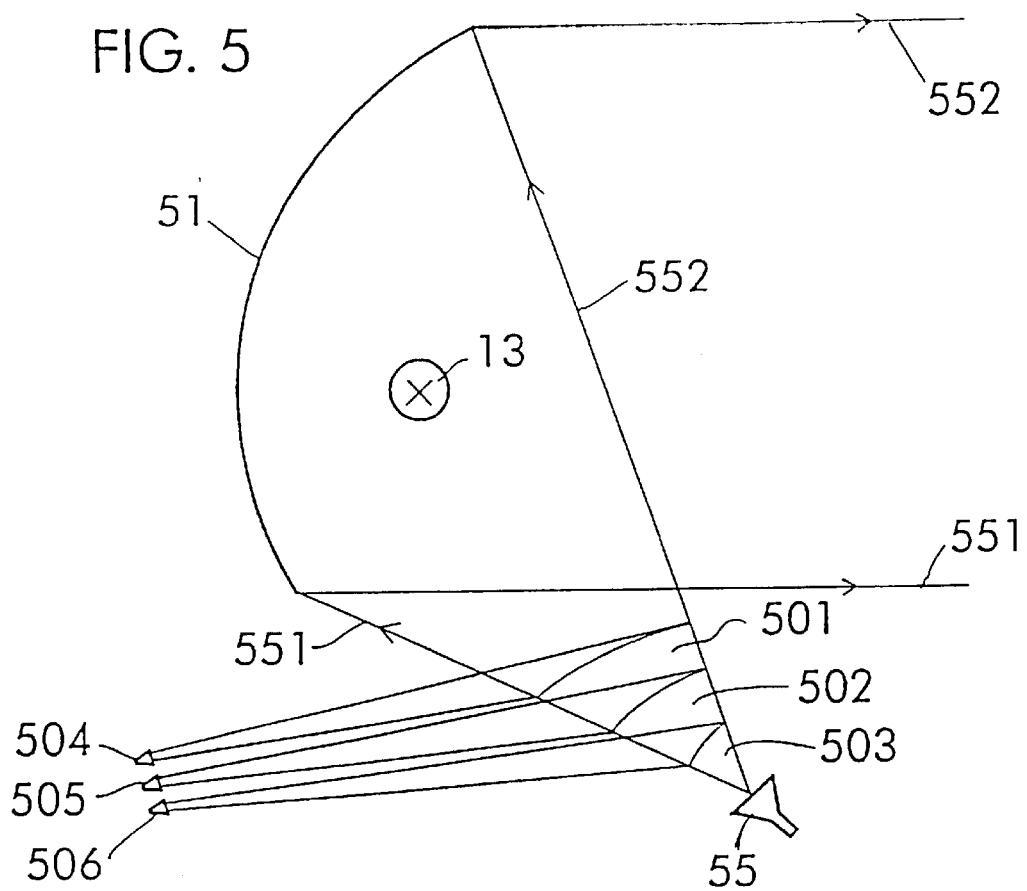
FIG. 5 is a schematic, side view of a fifth embodiment of the headlight with an integrated microwave antenna according to the invention, having a non-rotationally-symmetrical reflector and lateral radiation of the microwaves by means of filtering sub-reflectors.

FIG. 5 shows a schematic, side view of a fifth embodiment of the headlight with an integrated microwave antenna according to the invention. In a non-rotationally-symmetrical, paraboloid reflector 51, the microwaves are radiated from the side by a feeder element 55. With filtering sub-reflectors 501, 502, 503, which are disposed in the radar beam path represented by edge beams 551 and 552, three different frequencies, for example, are filtered out of the reflected radar beam and deflected laterally toward three associated receiving elements 504, 505 and 506. The filtering sub-reflectors 501, 502 and 503 can be embodied simply with frequency-selective structures on their surfaces, and thus possess the desired filtering characteristic. This arrangement is suited as a multiple-beam system, in which the sub-reflectors 501, 502 and 503 can be rotated so as to effect a plurality of radiating directions of the primary lobe. This is then an angle-resolving radar.

Figure 6:
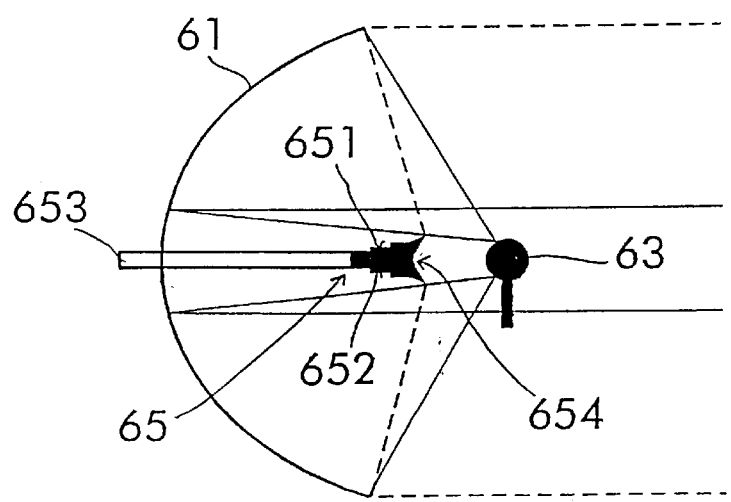
FIG. 6 is a schematic, side view of a sixth embodiment of the headlight with an integrated microwave antenna according to the invention, having a rotationally-symmetrical reflector and a centrally-disposed feeder radiator with an auxiliary reflector.

FIG. 6 shows a schematic, side view of a sixth embodiment of the headlight with an integrated microwave antenna according to the invention, having a rotationally-symmetrical, paraboloid or shaped reflector 61 and a centrally-disposed feeder radiator 65. The energy to be radiated is supplied to the feeder radiator 65 via a round, hollow conductor 653. The feeder radiator 65 is a dielectric radiator, and possesses diagonal, specially-structured surfaces 651 and 652 that face the reflector 61; the microwaves are radiated toward the reflector 61 over these surfaces.

A gas discharge lamp 63 or a halogen lamp, a so-called H4 lamp, is preferably disposed as a light source in the focal point of the reflector 61. The dielectric radiator 65 disposed centrally between the reflector 61 and the light source 63 has on its side facing the light source 63 a shaped surface 654, which forms a shaped auxiliary reflector that is metallized inside the dialectic radiator 65 and, on the outside, can be aluminum-coated facing the light source 63 for reducing shadowing.

In the embodiment of FIG. 6, the electrical system radiating the microwaves comprises the dielectric backward radiator 65, whose geometry is similar to the Cassegrain principle. The electromagnetic wave exiting the round, hollow conductor 653 is guided inside the dielectric radiator part, reflected at the auxiliary reflector formed by metallization on the surface 654 of the dielectric, and radiated in the direction of the reflector 61. A further degree of freedom for dimensioning the electrical system is provided by the shape of the outside surface of the dielectric represented as surfaces 651, 652 in the side view of FIG. 6. Even with a parabolic contour of the optical system, the electrical system can be dimensioned independently thereof. The dimensions of the auxiliary reflector 654 can be kept small by the selection of the dielectric permittivities. This advantageously permits the arrangement of the light source 63 in front of the auxiliary reflector 654, which is preferably aluminum-coated, in the focal point of the reflector 61.

Rotationally-symmetrical arrangements are associated with fundamental shadow problems that affect the optical as well as the electrical systems. On the other hand, the extremely compact design is particularly advantageous. The further illustrated embodiments, which are provided with a headlight configured as an offset reflector, offer advantageous alternatives.

Figure 7:
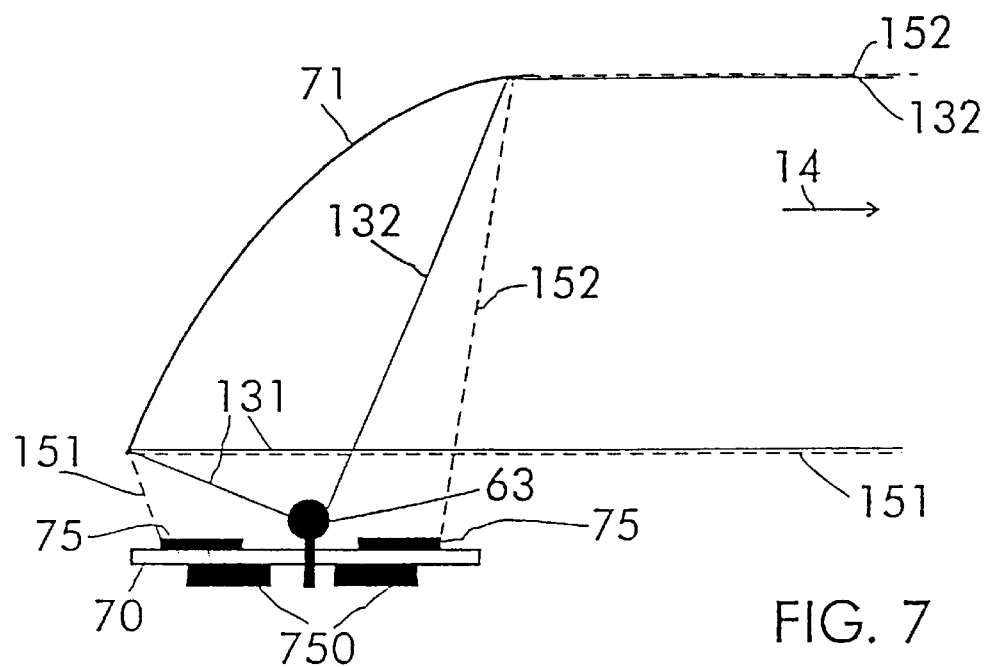
FIG. 7 is a schematic, side view of a seventh embodiment of the headlight with an integrated microwave antenna according to the invention, having an offset reflector and elements that are mounted on a carrier substrate and radiate directly into the reflector.

FIG. 7 shows a schematic, side view of a reflector offset arrangement in a seventh embodiment of the headlight with an integrated microwave antenna according to the invention. A reflector 71 constitutes a cutout of a rotational paraboloid. The radiating elements, which radiate directly into the reflector 71, are mounted on a carrier substrate 70. The carrier substrate 70 is disposed with its plane parallel to the radiation direction 14 of the headlight. The electrical feeder element of the microwave system is configured as a planar array comprising one or a plurality of planar radiator elements 75, so-called patches. This feeder element is mounted on the top side of the carrier substrate 70.

The design of the primary radiator can be such that either the primary field pattern is shaped by corresponding excitation of the patches by way of a distributor network, or the patches are actuated in phase such that the microwave beam can be pivoted. Furthermore, the individual radiator elements 75 can also be guided separately to corresponding transmitter-receiver units 750. A system having a plurality of radiation lobes can be realized in this manner.

To improve the electrical and optical properties, the surface of the reflector 71 can have a special shape. For example, contoured radiated field patterns or radiated field patterns having low secondary lobes can be created. The primary radiator can be configured as a double-sided substrate, as shown. This permits an integration of the microwave circuit on the underside of the carrier substrate 70, resulting in a very compact design. The array of planar radiator elements 75 is configured such that a central opening or recess is provided for mounting the light source 63, again preferably a gas discharge lamp, particularly a high-pressure gas discharge lamp. In FIG. 7, the limiting edge beams of the optical system beam path are provided with reference numerals 131 and 132, and the limiting edge beams of the electrical microwave system are indicated by 151 and 152.

In this illustrated embodiment of the headlight with an integrated microwave antenna according to the invention, both the optical and electrical systems are free from disturbing shadowing.

Figure 8:
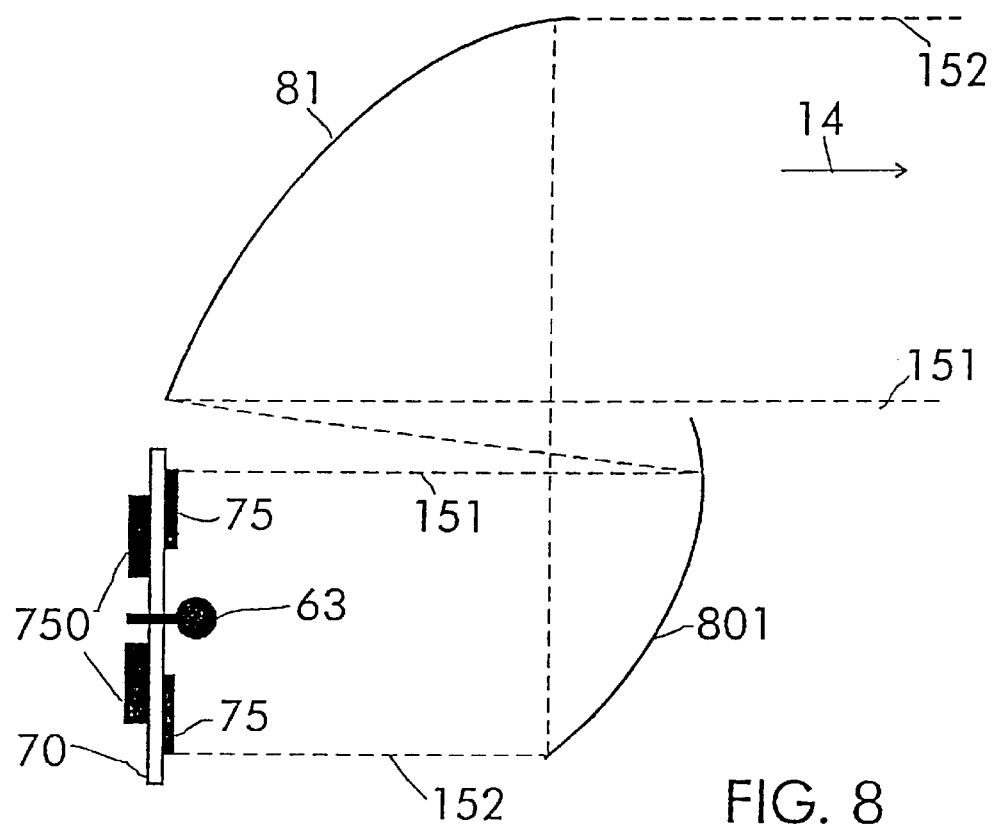
FIG. 8 is a schematic, side view of an eighth embodiment of the headlight with an integrated microwave antenna according to the invention, having an offset reflector and elements that are mounted on a carrier substrate and radiate directly into the reflector via a shaped auxiliary reflector.

The single-reflector arrangement shown in FIG. 7 can be expanded to a dual-reflector system with the addition of a further auxiliary reflector. FIG. 8 shows a schematic, side view of this eighth embodiment of the headlight with an integrated microwave antenna according to the invention. The illustrated dual-reflector arrangement is configured with a specially-shaped offset reflector 81 and an auxiliary reflector 801 shaped according to the Gregory system. This means that the auxiliary reflector 801 is a cutout of a rotational ellipsoid. The dual-reflector arrangement could also be configured according to the Cassegrain system, in which instance the auxiliary reflector would be configured as a cutout of a rotational hyperboloid. Depending on the provided application, it is also possible to provide an arbitrarily-shaped surface for the auxiliary reflector and/or the reflector.

In this arrangement, the carrier substrate 70, with its mounted elements, namely the planar radiator elements 75 on the one side and the transmitter/receiver units 750 on the other side, and the integrated light source 63, is positioned such that its plane extends perpendicular to the radiation direction 14 of the headlight. The electrical and optical radiation is effected indirectly into the reflector 81 via the specially-shaped auxiliary reflector 801. The edge beams of the electrical microwave system are indicated by 151 and 152 in FIG. 8.

In the practical realization of this eighth embodiment of a headlight, two reflectors 81 and 801 are usefully disposed in a common housing. It is clear that the space conditions are different from those of the seventh embodiment according to FIG. 7.

In the above-described embodiments, different lamps can be used as a light source. It is advantageous to use halogen lamps, particularly H4 lamps. Corresponding to a recent development in motor-vehicle headlight technology, it is also becoming possible in more situations to use gas discharge lamps, particularly high-pressure gas discharge lamps, with their significantly higher luminous efficiency and drastically-reduced energy consumption. Currently, the aforementioned H4 lamps are typically used in parabolic headlights, whereas the gas discharge lamps are typically used for reflection headlights with lenses.

The microwave system combined with or integrated into the optical system is particularly intended for use as a vehicle radar system, specifically as distance radar or control support for the driver. A resolution capability in the meter range to the centimeter range is required for ascertaining obstacles. The resolution capability of the necessary microwave system must correspondingly be improved by about a power of ten. Therefore, the microwave system used in the invention is advantageously operated in a range of about 10–100 GHz, which corresponds to a wavelength of about 3 cm–3 mm. A particularly preferred frequency range lies between about 76–77 GHz, corresponding to a wavelength of about 4 mm. With a wavelength of this type, sufficiently-small feeder elements can be embodied for combination with the optical system inside a headlight.

The functional and spatial separation of the optical and electrical systems provided by the invention offers the option of optimizing each system separately for a specific headlight and application objective, and then adjusting the systems together using the common reflector after they have been installed in a space-saving manner into a single headlight or motor-vehicle lamp.

We claim:

1. A headlight with an integrated microwave antenna, having a headlight reflector (11, 21, 31, 41, 51,61, 71, 81) that is used both for bundling the light of the headlight and for bundling the microwave beams, wherein:

an optical system, with its light source (13, 63), and a microwave system, with its feeder element (15, 45, 55, 65, 75) and receiver element, are configured and disposed functionally and spatially completely separately from one another; and, radiation of the microwaves by the feeder element (15, 45, 55, 65, 75) is in a direction solely toward the reflector and occurs in one of a direct path and an indirect path via one of a sub-reflector and an auxiliary reflector (12, 32, 801).

2. The headlight with an integrated microwave antenna according to claim 1, wherein the headlight reflector is a paraboloid reflector (11, 21, 31, 41, 51,61).

3. The headlight with an integrated microwave antenna according to claim 2, wherein the headlight reflector (11, 21, 31, 41, 51,61, 71, 81) is one of a rotationally symmetrical reflector (11, 21, 31, 41, 51,61) and an offset reflector (51, 71, 81).

4. The headlight with an integrated microwave antenna according to claim 1, wherein the headlight reflector (31, 41) is provided with at least one of a scatter plate (38, 49) and a dielectric lens (37) for reflected beams.

5. The headlight with an integrated microwave antenna according to claim 1, wherein the feeder element is one of a feeder horn (45, 65), a dielectric feeder radiator (75), a planar microstrip patch and a planar microstrip conductor patch array.

6. The headlight with an integrated microwave antenna according to claim 1, wherein one of the feeder element (15, 45, 65) and a sub-reflector (12, 32) is disposed so as to block direct light of the light source (13) from exiting the headlight.

7. The headlight with an integrated microwave antenna according to claim 6, wherein the one of the feeder element (15, 45, 65) and the sub-reflector (12, 32) which is disposed to block direct light of the light source (13) is disposed between the light source and a radiation exit of the headlight.

8. The headlight with an integrated microwave antenna according to claim 1, wherein the light source (63), one planar microwave feeder element (75) and at least one planar microwave receiver element are mounted on a common planar carrier substrate (70), and the carrier substrate (70) is disposed outside an offset reflector (71).

9. The headlight with an integrated microwave antenna according to claim 8, wherein the arrangement of the carrier substrate (70) and the elements (63, 75, 750) mounted on it is such that light and microwaves are radiated directly between the elements and the offset reflector.

10. The headlight with an integrated microwave antenna according to claim 8, wherein the arrangement of the carrier substrate (70) and the elements (63, 75, 750) mounted on it is such that light and microwaves are radiated indirectly, via an auxiliary reflector (801) onto the offset reflector (81) which is configured with a special shape.

11. The headlight with an integrated microwave antenna according to claim 10, wherein at least one of the auxiliary reflector (801) and the offset reflector (71, 81) is a cutout(s) of one of a rotational ellipsoid and a rotational hyperboloid.

12. The headlight with an integrated microwave antenna according to claim 10, wherein the plane of the carrier substrate is disposed perpendicular to the direction of light reflected by the headlight reflector.

13. The headlight with an integrated microwave antenna according to claim 9, wherein the plane of the carrier substrate is disposed parallel to the direction of light reflected by the headlight reflector.

14. The headlight with an integrated microwave antenna according to claim 1, wherein one of a halogen lamp (13) and a gas discharge lamp is provided as the light source (13, 63).

15. The headlight with an integrated microwave antenna according to claim 1 wherein the microwave system is operated in a range of about 10–100 GHz.

16. The headlight with an integrated microwave antenna according to claim 15, wherein the microwave system is operated in a range of about 76–77 Ghz.

17. The headlight with an integrated microwave antenna according to claim 1, wherein: the headlight reflector is rotationally symmetrical; the light source is disposed at the focal point of the headlight reflector; and the feeder element is a dielectric radiator which is disposed centrally between the light source and the reflector and has an auxiliary reflector at its end facing the light source.

18. A headlight with an integrated microwave antenna, having a reflector (11, 21, 31, 41, 51, 61, 71, 81) that is used both for bundling the light of the headlight and for bundling the microwave beams, and wherein:

an optical system, with its light source (13, 63), and a microwave system, with its feeder element (15, 45, 55, 65, 75) and receiver element, are configured and disposed functionally and spatially completely separately from one another;

a radiation beam of the microwaves generated by the feeder element (15, 45, 55, 65, 75) is directed only onto the reflector (11, 21, 31, 41, 51, 51, 71, 81) by one of directly and indirectly via one of a sub-reflector and an auxiliary reflector (12, 31, 801): and, the elements are arranged essentially inside a space defined by the reflector (11, 21, 31, 41, 51, 51, 71, 81) for both the direct and indirect radiation/reception of the microwaves.

* * * * *